United States Patent

[11] 3,598,192

| [72] | Inventor | Floyd W. Becker<br>Calgary, Alberta, Canada |
|---|---|---|
| [21] | Appl. No. | 876,417 |
| [22] | Filed | Nov. 13, 1969 |
| [45] | Patented | Aug. 10, 1971 |
| [73] | Assignee | Becker Drills Limited<br>Calgary, Alberta, Canada |

[54] CASING SEAL FOR A ROTARY DRILL APPARATUS
6 Claims, 1 Drawing Fig.

[52] U.S. Cl. .................................................. 175/210
[51] Int. Cl. .................................................. E21b 21/00
[50] Field of Search ........................................ 175/210, 209, 211; 166/84; 277/30, 31

[56] References Cited
UNITED STATES PATENTS

| 1,131,009 | 3/1915 | Rylander | 175/209 |
| 1,928,291 | 9/1933 | Kelley | 175/209 |
| 2,164,857 | 7/1939 | MacClatchie | 277/31 |
| 2,196,676 | 4/1940 | Johnson et al. | 277/30 |
| 2,620,208 | 12/1952 | Patch et al. | 277/30 X |
| 2,721,725 | 10/1955 | Biggs et al. | 175/209 |
| 2,879,035 | 3/1959 | Tilden | 175/209 |
| 2,927,774 | 3/1960 | Ormsby | 175/210 X |

*Primary Examiner*—Stephen J. Novosad
*Attorney*—William George Hopley

ABSTRACT: An apparatus for sealing a rotary drill to an encased hole which consists of an annular resilient member secured to the hole casing and a cylindrical body mounted above the resilient member. A rotatable housing is mounted on the cylindrical body which has a flexible annular member coaxial therewith. A channel is provided through the casing, resilient member, cylindrical body and rotatable housing for the passage of a drill pipe. The flexible annular member is capable of clasping the drill pipe and providing a seal therewith while the rotatable housing permits rotation of the drill pipe.

PATENTED AUG 10 1971   3,598,192
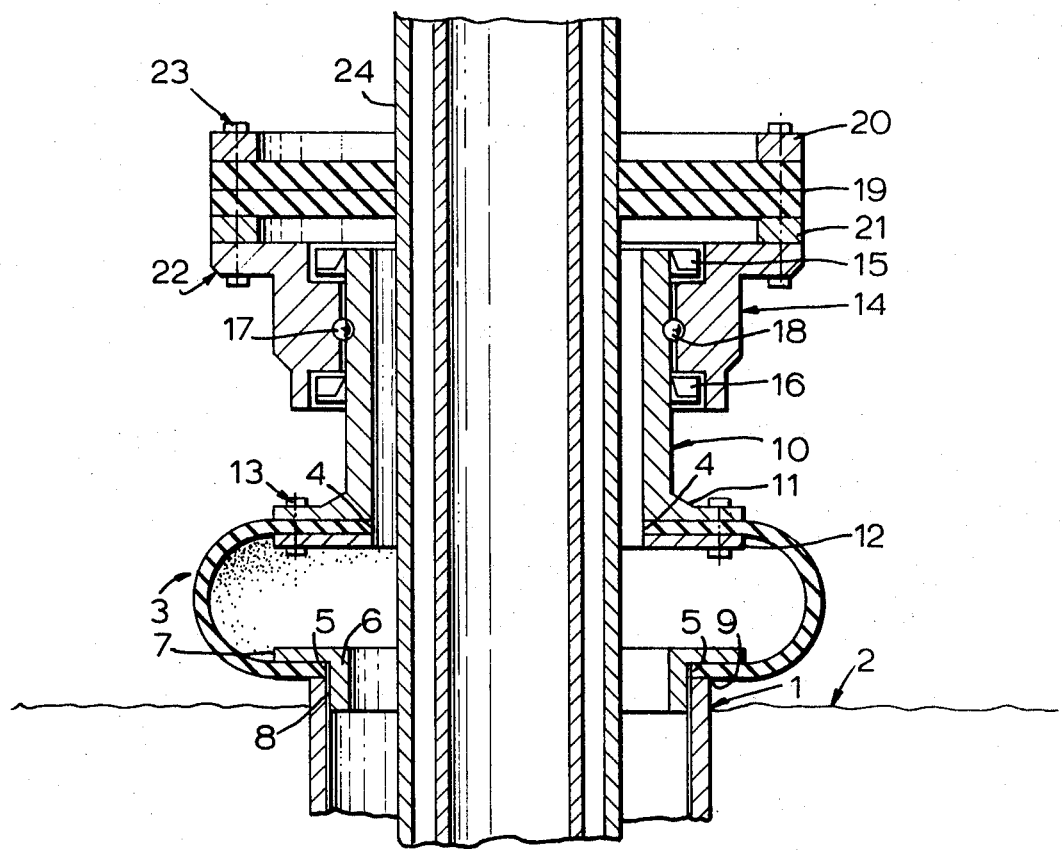
INVENTOR.
FLOYD W. BECKER
BY William G. Hopley

CASING SEAL FOR A ROTARY DRILL APPARATUS

This invention relates to a seal for an encased hole. More particularly it relates to a seal for sealing a rotary drill apparatus to an encased drill hole.

In drilling operations particularly in mining explorations it is important to obtain accurate samples. Sample loss should therefore be kept to a minimum. However, in drilling operations using fluid for recovering samples, fluid occasionally escapes between the drill pipe and drill holes thereby carrying some sample material to the surface where it is lost at ground level. In this and other drilling operations using fluid recovery of samples, leakage between the drill pipe and drill hole throws dirt and sample material to the surface where they may damage the working parts of the drilling apparatus or hinder the drilling operators view of the drill sight.

Various methods have been used in the past to control this leakage at the surface of the drill hole but some fluid losses are still encountered because the drill hole is not completely sealed. One such apparatus presently in use is an inverted rubber tub with an opening through its inverted base so that the rim of the tub is spaced from and around the drill hole and the drill pipe passes through said opening. This opening is of a size to fit snugly around the drill pipe. Because of this snug fit the rubber tub usually rotates with the rotary drill pipe. The rubber tub is not sealed at the surface of the drill hole and consequently while this tub deflects the dirt and samples away from the working parts of the apparatus to a considerable extent there is still some loss of fluid and sample fragments which escapes between the rubber tub and the surface.

The apparatus of the present invention provides an improved seal by means of an apparatus which may be sealed to a casing in the upper end of the drill hole and at the same time is sealed to the rotating drill pipe.

It is therefore an object of this invention to provide an apparatus for sealing a rotary drill pipe to an encased drill hole and to maintain satisfactory sealing throughout the rotary drilling operation.

It is another object of this invention to provide an apparatus for sealing a rotary drill pipe to an encased drill hole while permitting limited horizontal movement of the drill pipe within the drill hole.

The above objects are obtained by an apparatus for sealing a rotary drill apparatus to an encased drill hole which comprises:

a. an annular resilient member having a pair of substantially parallel rims spaced from each other, the inner edge of said rims defining the inner circumference of said annular resilient member;
b. means for axially securing and sealing said annular resilient member to the encased hole, said means providing an axial passage between the interior of said annular resilient member and the encased hole;
c. a cylindrical body mounted axially above said annular resilient member and secured thereto;
d. a housing mounted outside said cylindrical body and axially rotatable thereon;
e. a flexible annular member secured to said housing above said cylindrical body and coaxial therewith, said flexible annular member having a central opening communicating with the interior of said annular resilient member by means of a central passage in said cylindrical body, said flexible annular member being capable of clasping the outer circumference of a drill pipe passing through the central opening and forming a seal therewith;
f. said central passage, said interior of the annular resilient member and said axial passage defining a channel through the apparatus the circumference of which is at least equal to the circumference of said central opening.

The single FIGURE of drawings is a cross-sectional elevation of the apparatus mounted on a drill hole casing.

Drill hole casing 1 is shown positioned in the upper end of a drill hole and projecting slightly above ground surface 2. The apparatus of the present invention includes an annular resilient member 3 which is flexible as well as resilient. This body member may be a tire or tirelike body and has a pair of spaced rims 4 and 5 which are substantially parallel to each other and which define the inner surface of annular resilient member 3.

A coupling 6 secures and seals the annular resilient member 3 to casing 1. A rim or flange 7 on coupling 6 is positioned inside annular resilient member 3 and a cylindrical portion 8 is snugly fitted into the interior of casing 1 and adjoins the inner wall of the casing. A seal is provided by means of the annular resilient member 3 on the side of rim 5 which acts as a gasket between flange 7 and edge 9 of casing 1.

A cylindrical body 10 is mounted on annular resilient member 3 by means of flange 11 which is secured to annular flange plate 12 inside annular resilient member 3 by means of bolts 13. A seal is provided by means of the said annular resilient member 3 on the side of rim 4 which acts as a gasket between flange 11 and annular flange plate 12.

A rotatable housing 14 is mounted on cylindrical body 10 and held in position by means of rails 15 and 16 on the outer circumference of body 10. Ball bearings 17 and 18 assist in the axial rotation of housing 14.

Flexible annular member 19 is mounted above housing 14 and securing to said housing between annular plates 20 and 21 which are bolted to flange 22 of housing 14 by means of bolts 23. Flexible annular member 19 may be of rubber or other flexible material and may consist of one or more layers of such material as shown in the drawing. Member 19 has an axial opening which corresponds to the outer diameter of the double-walled drill pipe 24. Since flexible member 19 is held firmly only at its outer circumference by annular plates 20 and 21, considerably free axial movement and buckling is permitted in order to provide a good seal with the drill pipe 24.

In setting up the seal for rotary drilling, the drill hole is enlarged for a few feet below the surface so that a casing may be snugly fitted into the enlargement. Surface casings of this type are well known in the art. The annular resilient member 3 is then positioned over the casing. The size of member 3 should be such that the diameter of its annular opening is large enough to permit free passage of drill pipe 24 but its lower rim 5 fits on the edge of casing 1 to form a gasket between the casing and coupling 6. Coupling 6 is lowered through annular resilient member 3 and positioned with its cylindrical portion 8 fitted axially in casing 1 and flange 7 fitted inside member 3 so that flange 7 rests on shoulder 9 of casing 1 with a portion of rim 5 of member 3 sandwiched therebetween.

Annular flange plate 12 is fitted inside annular resilient member 3 and body 10 including rotatable housing 14 is positioned axially on member 3 so that flange 11 rests on the outside of rim 4 of member 3. Flange plate 12 is secured to flange 11 by means of bolts passing through flange 11, rim 4 and plate 12 so that the resilient material of member 3 acts as a gasket between flange 11 and ring 12.

With body 10 secured in place, flexible member 19 is laminated between annular plates 20 and 21 and the laminate is bolted to flange 22 of housing 14 by means of bolts 23 which pass through plate 20, member 19 and plate 21.

With the sealing apparatus in place on the hole casing the drill pipe may be lowered into the hole to continue drill operations. The annular opening in flexible member 19 is substantially equivalent to the outer diameter of the drill pipe and may be slightly smaller than the diameter of the drill pipe to ensure a firm fit when member 19 is slightly buckled. Since member 19 is secured only at its outer rim by rings 20 and 21 the inner rim has considerable flexibility. In the case where the circumference of the annular opening is smaller than the circumference of the drill pipe the flexible member will fit tightly around the drill pipe with some buckling of the flexible member. The circumference of body 10, the annular opening in resilient member 3 and the circumference of casing 1 are large enough to permit uninterrupted passage of the drill pipe into the drill hole.

When the rotary drill is operated, rotatable housing 14 may rotate with the drill pipe due to the friction grip of flexible member 19 on the pipe. Annular resilient member 3 permits a degree of flexibility so that body 10 may move laterally with respect to casing 1 to a slight degree. By means of this apparatus the danger of breaking the drill pipe or sealing apparatus due to tension in the system is considerably reduced while maintaining a tight seal.

I claim:

1. An apparatus for sealing a rotary drill to an encased drill hole which comprises:
   a. an annular resilient member having a pair of substantially parallel rims spaced from each other, the inner edge of said rims defining the inner circumference of said annular resilient member;
   b. means for axially securing and sealing said annular resilient member to the encased hole, said means providing an axial passage between the interior of said annular resilient member and the encased hole;
   c. a cylindrical body mounted axially above said annular resilient member and secured thereto;
   d. a housing mounted outside said cylindrical body and axially rotatable thereon;
   e. a flexible annular member secured to said housing above said cylindrical body and coaxial therewith, said flexible annular member having a central opening communicating with the interior of said annular resilient member by means of a central passage in said cylindrical body, said flexible annular member being capable of clasping the outer circumference of a drill pipe passing through the central opening and forming a seal therewith;
   f. said central passage, said interior of the annular resilient member and said axial passage defining a channel through the apparatus the circumference of which is at least equal to the circumference of said central opening.

2. An apparatus as claimed in claim 1 wherein said means for axially securing and sealing said annular resilient member to the encased hole consists of a coupling which comprises a cylindrical portion fitted into the encased hole and a flange at one end fitted inside the annular resilient member.

3. An apparatus as claimed in claim 2 wherein the cylindrical portion adjoins the inner wall of the encased hole and wherein the lower rim of said annular resilient member abuts the edge of the encased hole and is secured in place by the flange fitted into said annular resilient member.

4. An apparatus as claimed in claim 3 wherein said housing is axially rotatable on said cylindrical body by means of a ball bearing surface and secured to said cylindrical body by means of horizontal rails attached to the outer wall of the cylindrical body.

5. An apparatus as claimed in claim 4 wherein said cylindrical body is secured to said annular resilient member by means of an annular flange plate fitted inside said annular resilient member and bolted through the upper rim of said annular resilient member.

6. An apparatus for sealing a rotary drill to an encased drill hole which comprises:
   a. an annular resilient member having a pair of substantially parallel rims spaced from each other, the inner edge of said rims defining the inner circumference of said annular resilient member;
   b. a coupling for axially securing and sealing said annular resilient member to the encased hole comprising a cylindrical portion fitted into and adjoining the encased hole and a flange at one end fitted inside the annular resilient member, the lower rim of said annular resilient member abutting the edge of the encased hole and secured in place by the said flange said coupling providing an axial passage between the interior of said annular resilient member and the encased hole;
   c. a cylindrical body mounted axially above said annular resilient member and secured thereto by means of an annular flange plate fitted inside said annular resilient member and bolted to the cylindrical body through the upper rim of said annular resilient member;
   d. a housing mounted outside said cylindrical body and axially rotatable thereon by means of a ball bearing surface, said housing being secured to said cylindrical body by means of horizontal rails attached to the outer wall of the cylindrical body;
   e. a flexible annular member secured to said housing above said cylindrical body and coaxial therewith, said flexible annular member having a central opening communicating with the interior of said annular resilient member by means of a central passage in said cylindrical body, said flexible annular member being capable of clasping the outer circumference of a drill pipe passing through the central opening and forming a seal therewith;
   f. said central passage, said interior of the annular resilient member and said axial passage defining a channel through the apparatus, the circumference of which is at least equal to the circumference of said central opening.